US012254829B2

(12) United States Patent
Guo et al.

(10) Patent No.: US 12,254,829 B2
(45) Date of Patent: Mar. 18, 2025

(54) PIXEL CIRCUIT, DRIVING METHOD THEREFOR, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yonglin Guo, Beijing (CN); Jingwen Zhang, Beijing (CN); Tingliang Liu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,662

(22) PCT Filed: May 30, 2022

(86) PCT No.: PCT/CN2022/096072
§ 371 (c)(1),
(2) Date: Mar. 16, 2023

(87) PCT Pub. No.: WO2023/230790
PCT Pub. Date: Dec. 7, 2023

(65) Prior Publication Data

US 2024/0290259 A1 Aug. 29, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2330/021* (2013.01); *G09G 2340/0435* (2013.01)

(58) Field of Classification Search
CPC ......... G09G 3/3233; G09G 2300/0819; G09G 2300/0842; G09G 2300/0861; G09G 2310/08; G09G 2320/0247; G09G 2330/021; G09G 2340/0435
See application file for complete search history.

(56) References Cited

U.S. PATENT DOCUMENTS

| | | | | |
|---|---|---|---|---|
| 10,157,572 | B2 * | 12/2018 | Lee | H01L 27/1255 |
| 11,527,197 | B2 * | 12/2022 | Park | G09G 3/32 |
| 11,557,255 | B2 * | 1/2023 | Kim | G09G 3/3266 |
| 11,581,385 | B2 * | 2/2023 | Yang | H10K 59/1216 |

(Continued)

*Primary Examiner* — Benyam Ketema
(74) *Attorney, Agent, or Firm* — IPro, PLLC

(57) ABSTRACT

In a pixel circuit, a first reset transistor is coupled between a gate of a drive transistor and an initialization signal terminal, and a gate of the first reset transistor is coupled to a reset control terminal; a compensation transistor is coupled between the gate and a first electrode of the drive transistor, and a gate of the compensation transistor is coupled to a first scan control terminal; a data writing transistor is coupled between a second electrode of the drive transistor and a data signal terminal, and a gate of the data writing transistor is coupled to a second scan control terminal; a first light emitting control transistor is coupled between the second electrode of the drive transistor and a first power supply terminal, and a gate of the first light emitting control transistor is coupled to a light emitting control terminal.

20 Claims, 17 Drawing Sheets

(56) References Cited

U.S. PATENT DOCUMENTS 11,903,281 B2 * 2/2024 Li ........................ G09G 3/3258
11,955,065 B2 * 4/2024 Yuan ........................ G09G 3/20
11,984,065 B2 * 5/2024 Li ........................ G09G 3/2092
12,035,594 B2 * 7/2024 Yang .................... H10K 59/352
2004/0135952 A1 * 7/2004 Kurashina ......... G02F 1/136227 349/110
2005/0285988 A1 * 12/2005 Nakagawa ........ G02F 1/136213 349/44
2006/0055336 A1 * 3/2006 Jeong ................... G09G 3/3233 315/169.3
2007/0007530 A1 * 1/2007 Wong .................. H01L 29/4908 257/E29.147
2007/0268220 A1 * 11/2007 Lee ...................... G09G 3/3241 345/76
2008/0290921 A1 * 11/2008 Park ................. H03K 3/356139 327/212
2009/0201231 A1 * 8/2009 Takahara ............. G09G 3/3233 345/76
2011/0157125 A1 * 6/2011 Choi .................... G09G 3/3233 315/160
2012/0001896 A1 * 1/2012 Han ..................... G09G 3/3233 345/76
2014/0306867 A1 * 10/2014 Qing .................... G09G 3/3233 345/76
2017/0124953 A1 * 5/2017 Shim .................... G09G 3/2018
2018/0062102 A1 * 3/2018 Kim ..................... H10K 59/124
2018/0158895 A1 * 6/2018 Lee ...................... H10K 59/124
2018/0254304 A1 * 9/2018 Hong ................... H10K 59/352
2020/0312942 A1 * 10/2020 Yang .................. H10K 59/1213
2020/0394950 A1 * 12/2020 Oh ....................... G09G 3/3266
2021/0027696 A1 * 1/2021 Kim ..................... G09G 3/3233
2021/0233989 A1 * 7/2021 Li ........................ H10K 59/131
2022/0157239 A1 * 5/2022 Zhang .................. G09G 3/3233
2022/0375408 A1 * 11/2022 Dong ................... G09G 3/3241
2023/0351969 A1 * 11/2023 Zhang .................. G09G 3/3258

* cited by examiner

--Prior Art--

--Prior Art--

PIXEL CIRCUIT, DRIVING METHOD THEREFOR, AND DISPLAY DEVICE

FIELD

The disclosure relates to the field of display technology, and particularly to a pixel circuit, a driving method therefor, and a display device.

BACKGROUND

At present, the Active Matrix Organic Light Emitting Diode (AMOLED) flexible screen technology is becoming more and more mature, and characteristics such as bendability, high contrast and low power consumption make the AMOLED flexible screen technology become the next-generation display mode to replace the Liquid Crystal Display (LCD).

Here, the OLED pixel is driven to emit light by a current generated by a Driving Thin Film Transistor (DTFT) in a saturated state. However, the current OLED panel manufacturing process is difficult to ensure uniformity of a threshold voltage of the DTFT, causing the problem of uneven brightness of pixels in the OLED light emitting device; and the DTFT hysteresis easily causes problems such as flickering and afterimage; and the problems such as flickering at a low gray scale occur easily when switching between different driving frequencies. These problems affect the display effect of the product.

SUMMARY

The disclosure provides a pixel circuit, a driving method therefor, and a display device, to ensure the design of narrow frame and low power consumption while improving the display effect.

In a first aspect, an embodiment of the disclosure provides a pixel circuit, including: a first reset transistor, a compensation transistor, a drive transistor, a data writing transistor, a first light emitting control transistor, a second light emitting control transistor, a second reset transistor, a storage capacitor and a light emitting device; where: the first reset transistor is coupled between a gate of the drive transistor and an initialization signal terminal, and a gate of the first reset transistor is coupled to a reset control terminal; the compensation transistor is coupled between the gate and a first electrode of the drive transistor, and a gate of the compensation transistor is coupled to a first scan control terminal; the data writing transistor is coupled between a second electrode of the drive transistor and a data signal terminal, and a gate of the data writing transistor is coupled to a second scan control terminal; the first light emitting control transistor is coupled between the second electrode of the drive transistor and a first power supply terminal, and a gate of the first light emitting control transistor is coupled to a light emitting control terminal; the second light emitting control transistor is coupled between the first electrode of the drive transistor and a first electrode of the light emitting device, and a gate of the second light emitting control transistor is coupled to the light emitting control terminal; the second reset transistor is coupled between the first electrode of the light emitting device and the initialization signal terminal, and a gate of the second reset transistor is coupled to the second scan control terminal; a second electrode of the light emitting device is coupled to a second power supply terminal; the storage capacitor is coupled between the first power supply terminal and the gate of the drive transistor; where the first scan control terminal is configured to receive a first scan control signal, the second scan control terminal is configured to receive a second scan control signal, an effective duration of the second scan control signal is greater than an effective duration of the first scan control signal, the effective duration of the first scan control signal is covered by the effective duration of the second scan control signal, the data signal terminal is configured to receive a constant reset signal within other effective duration of the second scan control signal except a covered part, and the data signal terminal is configured to receive a data signal within a duration of the covered part.

In a possible implementation, the reset control terminal, the first scan control terminal and the second scan control terminal are respectively coupled to different gate drive units.

In a possible implementation, the reset control terminal is configured to receive a reset control signal, the reset control signal and the first scan control signal are provided by output terminals in different stages of a same first gate drive unit, and the reset control signal is earlier than the first scan control signal.

In a possible implementation, the reset control terminal is configured to receive a reset control signal, the reset control signal and the second scan control signal are provided by output terminals in different stages of a same second gate drive unit, and the reset control signal is earlier than the second scan control signal.

In a possible implementation, the first reset transistor, the compensation transistor, the drive transistor, the data write transistor, the first light emitting control transistor, the second light emitting control transistor and the second reset transistor are all P-type transistors.

In a possible implementation, the drive transistor, the data writing transistor, the first light emitting control transistor, the second light emitting control transistor and the second reset transistor are all P-type transistors, and the first reset transistor and/or the compensation transistor are N-type transistors.

In a possible implementation, active layers of the drive transistor, the data writing transistor, the first light emitting control transistor, the second light emitting control transistor and the second reset transistor are made of a low temperature poly-silicon material, and active layers of the first reset transistor and the compensation transistor are made of a metal oxide semiconductor material.

In a second aspect, an embodiment of the disclosure further provides a display device, including: a plurality of pixel circuits described in any one of the above implementations arranged in a display area, and a gate drive circuit arranged in a non-display area, where the gate drive circuit is configured to provide corresponding signals to reset control terminals, first scan control terminals and second scan control terminals of the pixel circuits.

In a possible implementation, the gate drive circuit includes a first gate drive unit and a second gate drive unit, the first gate drive unit is coupled to a first scan control terminal of each pixel circuit, and the second gate drive unit is coupled to a second scan control terminal of each pixel circuit.

In a possible implementation, the first gate drive unit is configured to provide a first scan control signal at a first frequency to the first scan control terminal; and the second gate drive unit is configured to provide a second scan control signal at a second frequency to the second scan control terminal; where the second frequency is greater than the first frequency, and an effective duration of the second scan control signal is greater than an effective duration of the first scan control signal.

In a possible implementation, the gate drive circuit further includes a reset drive unit coupled to a reset control terminal of each pixel circuit.

In a possible implementation, the first gate drive unit is coupled to a reset control terminal of each pixel circuit, and the reset control terminal and the first scan control terminal of a same pixel circuit are respectively coupled to output terminals in different stages of the first gate drive unit.

In a possible implementation, the second gate drive unit is coupled to a reset control terminal of each pixel circuit, and the reset control terminal and the second scan control terminal of a same pixel circuit are respectively coupled to output terminals in different stages of the second gate drive unit.

In a third aspect, an embodiment of the disclosure further provides a driving method for the pixel circuit as described in any one of the above implementations, including: dividing a current display frame of a display device into one writing frame and N holding frames according to a current refresh frequency and a reference refresh frequency of the display device, where N is an integer greater than 1, and the writing frame includes a first reset phase and/or a second reset phase; in the first reset phase, controlling the data writing transistor and the drive transistor to be turned on, and writing the constant reset signal into the second electrode and the first electrode of the drive transistor through the data signal terminal; in the second reset phase, controlling the data writing transistor to be turned on, and writing the constant reset signal into the second electrode of the drive transistor through the data signal terminal.

In a possible implementation, for the holding frames, the method further includes: holding a reset control signal received by the reset control terminal and a first scan signal received by the first scan control terminal as invalid potentials; writing the constant reset signal into the first electrode of the drive transistor through the data signal terminal under control of the second scan control terminal.

In a possible implementation, the writing frame includes an initialization phase, the first reset phase, a data writing phase, the second reset phase and a light emitting phase arranged in sequence, and the method further includes: in the initialization phase, controlling the first reset transistor and the drive transistor to be turned on, and writing an initialization signal into the gate of the drive transistor through the initialization signal terminal; in the data writing phase, controlling the compensation transistor and the data writing transistor to be turned on, writing the data signal into the second electrode of the drive transistor through the data signal terminal, writing a threshold voltage of the drive transistor and the data signal into the gate of the drive transistor through the compensation transistor, and storing the threshold voltage and the data signal in the storage capacitor; in the light emitting phase, controlling the first light emitting control transistor and the second light emitting control transistor to be turned on, where the light emitting device emits light.

DETAILED DESCRIPTION OF EMBODIMENTS

In order to make purposes, technical solutions and advantages of the disclosure clearer, the technical solutions of embodiments of the disclosure will be described clearly and completely below in combination with the accompanying drawings of embodiments of the disclosure. Obviously the described embodiments are a part of embodiments of the disclosure but not all embodiments. Also in the case of no conflict, embodiments and the features therein in the disclosure can be combined with each other. Based upon embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The word such as "include" or "comprise" or the like used in the disclosure means that the element or object appearing before this word encompasses the elements or objects and their equivalents listed after this word, without excluding other elements or objects.

It should be noted that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

Figure 1:
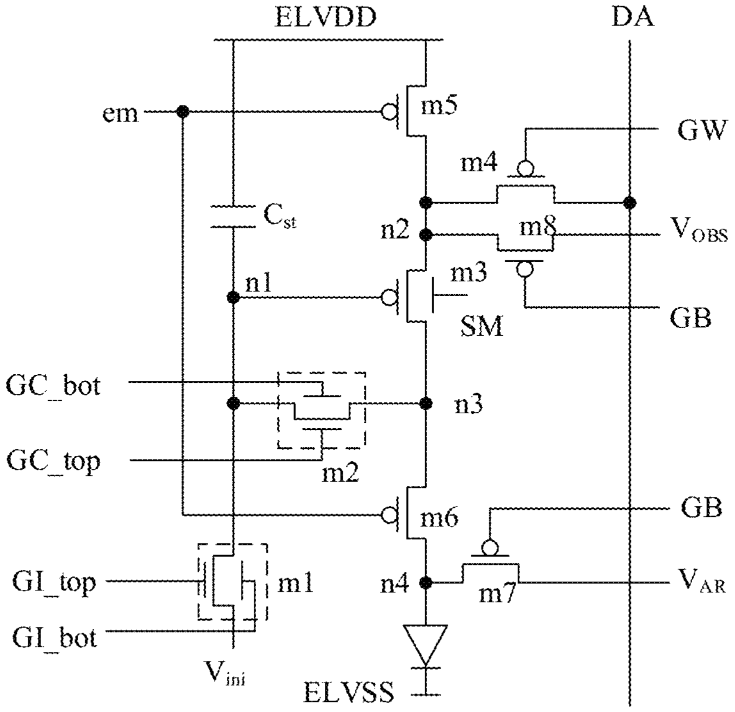
FIG. 1 is a schematic structural diagram of a pixel circuit used in the related art.
Figure 2:
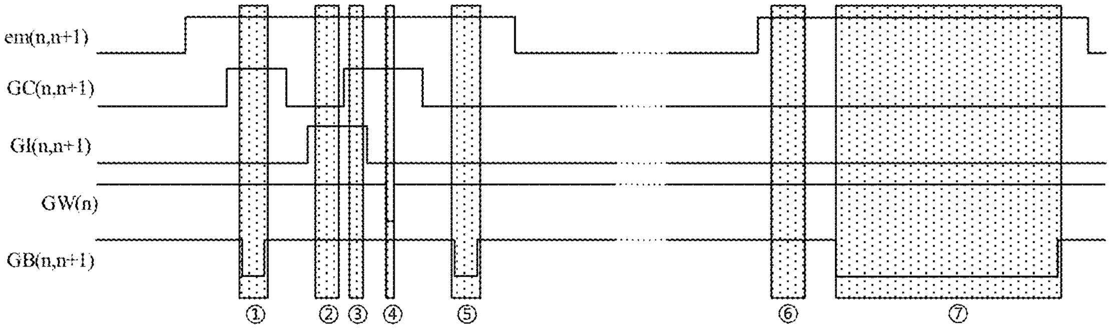
FIG. 2 is a timing diagram used by the pixel circuit shown in FIG. 1.

In the related art, the above problems can be improved by using a pixel circuit shown in FIG. 1 in combination with a timing diagram shown in FIG. 2. The pixel circuit includes eight transistors m1, m2, m3, m4, m5, m6, m7 and m8; m3 represents a DTFT; n1, n2 and n3 respectively represent nodes of transistors correspondingly coupled to electrodes of the DTFT; m1 and m2 are metal oxide transistors, and m3 to m8 are low temperature poly-silicon transistors. In the phase ①, n1, n2 and n3 are reset at a high level and emit light; in the phase ②, n1 is reset at a low level, and the DTFT has a larger Vgs; in the phase ③, n1, n2 and n3 are reset at a low level; in the phase ④, the data is written through a DA terminal, and a threshold voltage of the DTFT is compensated; in the phase ⑤, an anode (corresponding to the node n4 in FIG. 3) is reset at a low level, and n3 is reset at a high level; in the phase ⑥, a light emitting control signal em is adjusted by the Pulse Width Modulation (PWM) technology; and in the phase ⑦, the anode is reset (Anode Reset), n3 is reset at a high level, which can improve the frequency cut flicker together with the phase ⑤ in which n3 is reset at the low level. In the process of controlling the pixel circuit shown in FIG. 1 by using the timing diagram shown in FIG. 2, the nodes n1, n2 and n3 may all be reset, or the nodes n1, n2 and n3 may be alternately reset by using high and low levels, and the voltage Vgs of the DTFT is increased, etc., thereby further addressing the hysteresis problem of the DTFT and ensuring the display effect.

However, in FIGS. 1 and 2, the pixel circuit is essentially an 8T1C structure, which requires five groups of gate drive circuits (Gate on Array (GOA)), three reset signals, and more complicated timing. In this case, more transistors and more GOAs and reset signals are not conducive to increasing the Pixels Per Inch (PPI), narrowing the borders and reducing the GOA power consumption.

For that reason, an embodiment of the disclosure provides a pixel circuit, a driving method therefor, and a display device, to ensure the design of narrow border and low power consumption while improving the display effect.

Figure 3:
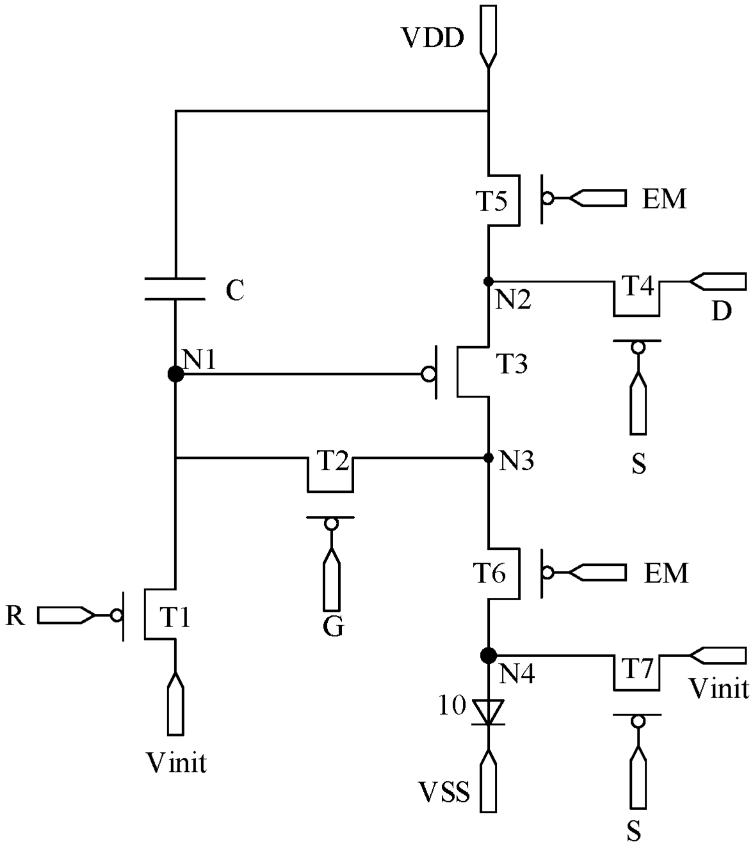
FIG. 3 is a schematic structural diagram of a pixel circuit according to an embodiment of the disclosure.

As shown in FIG. 3, an embodiment of the disclosure provides a pixel circuit, which includes: a first reset transistor T1, a compensation transistor T2, a drive transistor T3, a data writing transistor T4, a first light emitting control transistor T5, a second light emitting control transistor T6, a second reset transistor T7, a storage capacitor C and a light emitting device 10.

The first reset transistor T1 is coupled between a gate of the drive transistor T3 and an initialization signal terminal Vinit, and a gate of the first reset transistor T1 is coupled to a reset control terminal R.

The compensation transistor T2 is coupled between the gate and a first electrode of the drive transistor T3, and a gate of the compensation transistor T2 is coupled to a first scan control terminal G.

The data writing transistor T4 is coupled between a second electrode of the drive transistor T3 and a data signal terminal D, and a gate of the data writing transistor T4 is coupled to a second scan control terminal S.

The first light emitting control transistor T5 is coupled between the second electrode of the drive transistor T3 and a first power supply terminal VDD, and a gate of the first light emitting control transistor T5 is coupled to a light emitting control terminal EM.

The second light emitting control transistor T6 is coupled between the first electrode of the drive transistor T3 and a first electrode of the light emitting device 10, and a gate of the second light emitting control transistor T6 is coupled to the light emitting control terminal EM.

The second reset transistor T7 is coupled between the first electrode of the light emitting device 10 and the initialization signal terminal Vinit, and a gate of the second reset transistor T7 is coupled to the second scan control terminal S.

A second electrode of the light emitting device 10 is coupled to a second power supply terminal VSS.

The storage capacitor C is coupled between the first power supply terminal VDD and the gate of the drive transistor T3.

The first scan control terminal G is configured to receive a first scan control signal, the second scan control terminal S is configured to receive a second scan control signal, an effective duration of the second scan control signal is greater than an effective duration of the first scan control signal, the effective duration of the first scan control signal is covered by the effective duration of the second scan control signal, the data signal terminal D is configured to receive a constant reset signal within other effective duration of the second scan control signal except a covered part, and the data signal terminal D is configured to receive a data signal within a duration of the covered part.

In a specific implementation process, still referring to FIG. 3, the pixel circuit provided by an embodiment of the disclosure may include seven transistors: a first reset transistor T1, a compensation transistor T2, a drive transistor T3, a data writing transistor T4, a first light emitting control transistor T5, a second light emitting control transistor T6 and a second reset transistor T7. Compared with the pixel circuit shown in FIG. 1, the quantity of transistors in the pixel circuit is reduced to facilitate the narrow border design. Here, the first reset transistor T1 is coupled between the gate of the drive transistor T3 and the initialization signal terminal Vinit, and the gate of the first reset transistor T1 is coupled to the reset control terminal R. In this way, when the first reset transistor T1 is turned on, the gate of the drive transistor T3 can be reset by the initialization signal terminal Vinit. The compensation transistor T2 is coupled between the gate and the first electrode of the drive transistor T3, and the gate of the compensation transistor T2 is coupled to the first scan control terminal G. The data writing transistor T4 is coupled between the second electrode of the drive transistor T3 and the data signal terminal D, and the gate of the data writing transistor T4 is coupled to the second scan control terminal S. When both the data writing transistor T4 and the compensation transistor T2 are turned on, the threshold voltage of the drive transistor T3 and the data signal provided by the data signal terminal D can be written into the gate of the drive transistor T3, thereby realizing the compensation for the threshold voltage of the drive transistor T3.

Still referring to FIG. 3, the first light emitting control transistor T5 is coupled between the second electrode of the drive transistor T3 and the first power supply terminal VDD, and the gate of the first light emitting control transistor T5 is coupled to the light emitting control terminal EM. The first power supply terminal VDD may be a high-potential power supply terminal, and may provide a constant high-potential signal. The second light emitting control transistor T6 is coupled between the first electrode of the drive transistor T3 and the first electrode of the light emitting device 10, and the gate of the second light emitting control transistor T6 is coupled to the light emitting control terminal EM. In this way, when both the first light emitting control transistor T5 and the second light emitting control transistor T6 are turned on, the light emitting device 10 emits light. The second reset transistor T7 is coupled between the first electrode of the light emitting device 10 and the initialization signal terminal Vinit, and the gate of the second reset transistor T7 is coupled to the second scan control terminal S. In this way, when the second reset transistor T7 is turned on, the initialization signal provided by the initialization signal terminal Vinit can be written into the first electrode of the light emitting device 10; and when the first electrode of the light emitting device 10 is an anode, the anode reset is realized, to ensure the low frequency display. The second electrode of the light emitting device 10 is coupled to the second power supply terminal VSS, and the second power supply terminal VSS may be a low-potential power supply terminal and may provide a constant low-potential signal. The storage capacitor C is coupled between the first power supply terminal VDD and the gate of the drive transistor T3. The storage capacitor C ensures the stabilized potential of the gate of the drive transistor T3, and thus ensures the driving effect.

Figure 4:
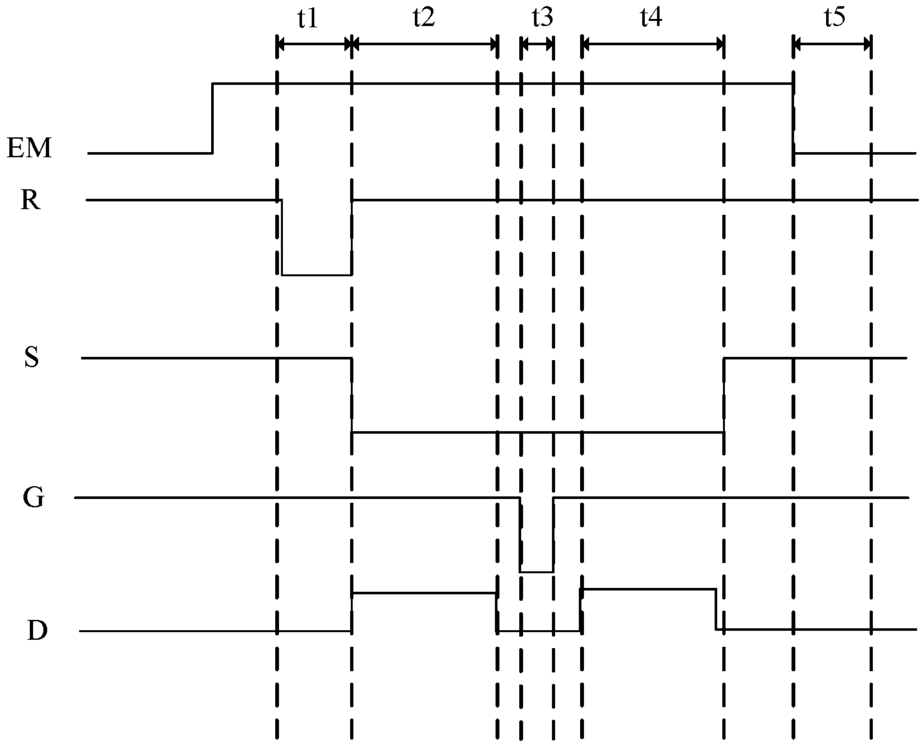
FIG. 4 is a timing diagram of a writing frame corresponding to the pixel circuit shown in FIG. 3.

Still referring to FIG. 3, the first reset transistor T1, the compensation transistor T2, the drive transistor T3, the data writing transistor T4, the first light emitting control transistor T5, the second light emitting control transistor T6 and the second reset transistor T7 are all P-type transistors. As shown in FIG. 4, FIG. 4 is a timing diagram of the writing frame corresponding to the pixel circuit shown in FIG. 3.

Still referring to FIG. 4, the first scan control terminal G is configured to receive the first scan control signal, the second scan control terminal S is configured to receive the second scan control signal, and the effective duration of the second scan control signal is greater than the effective duration of the first scan control signal. In this way, the reset of the second electrode of the drive transistor T3 by the data signal terminal D can be controlled by the second scan signal with the relatively long effective duration, thus ensuring the driving capability of the pixel circuit. Moreover, the effective duration of the first scan control signal is covered by the effective duration of the second scan control signal, the data signal terminal D is configured to receive a constant reset signal within other effective duration of the second scan control signal except a covered part, and the data signal terminal D is configured to receive a data signal within the duration of the covered part. In this way, the required signal can be provided to the data signal terminal D within the required control duration. On the one hand, the data signal terminal D receives the constant reset signal within other effective duration, thus ensuring that the first electrode of the drive transistor T3 has the same potential during the writing frame and the holding frame, and avoiding the problem of frequency-cut flicker; and on the other hand, the data signal terminal D receives the data signal and writes the data signal and the threshold voltage of the drive transistor T3 into the gate of the drive transistor T3 within the duration of the covered part, thereby ensuring the uniformity of the threshold voltage of the drive transistor T3.

In one of embodiments, the reset control terminal R, the first scan control terminal G and the second scan control terminal S are respectively coupled to different gate drive units. Correspondingly, the pixel circuit provided by an embodiment of the disclosure needs to be driven by three different gate drive units. Compared with FIG. 1, the quantity of required gate drive units is less, which is more conducive to the narrow border design.

In one of embodiments, the reset control terminal R is configured to receive a reset control signal, the reset control signal and the first scan control signal are provided by output terminals in different stages of a same first gate drive unit, and the reset control signal is earlier than the first scan control signal. For example, the reset control signal can be opened for eight pixel rows in advance in the pixel rows of the display panel, that is, when the first scan control terminal of the current pixel row receives an effective first scan control signal, reset control terminals of the first eight pixel rows before the current pixel row receive an effective reset control signal simultaneously. That is, the reset control terminal R and the first scan control terminal G are respectively coupled to the output terminals in different stages of the same first gate drive unit, and the second scan control terminal S is coupled to another gate drive unit than the first gate drive unit. In this way, the pixel circuit provided by an embodiment of the disclosure needs to be driven by two gate drive units. Compared with FIG. 1, the quantity of required gate drive units is less, which is more conducive to the narrow border design. Moreover, the reset control signal is earlier than the first scan control signal. In this way, it can be ensured that the initialization signal provided by the initialization signal terminal Vinit is firstly written to the gate of the drive transistor T3, and then the compensation transistor T2 is turned on, to compensate the threshold voltage of the gate of the drive transistor T3 and thus ensure the use performance of the pixel circuit.

In one of embodiments, the reset control terminal R is configured to receive a reset control signal, the reset control signal and the second scan control signal are provided by output terminals in different stages of a same second gate drive unit, and the reset control signal is earlier than the second scan control signal. That is, the reset control terminal R and the second scan control terminal S are respectively coupled to the output terminals in different stages of the same second gate drive unit, and the first scan control terminal G is coupled to another gate drive unit than the second gate drive unit. In this way, the pixel circuit provided by an embodiment of the disclosure needs to be driven by two gate drive units. Compared with FIG. 1, the quantity of required gate drive units is less, which is more conducive to the narrow border design. Moreover, the reset control signal is earlier than the second scan control signal. In this way, it can be ensured that the initialization signal provided by the initialization signal terminal Vinit is firstly written to the gate of the drive transistor T3, and then the data writing transistor T4 and the second reset transistor T7 are turned on, so that the signal provided by the data signal terminal D is written into the second electrode of the drive transistor T3, and the initialization signal provided by the initialization signal terminal Vinit is written into the first electrode of the light emitting device 10, to ensure the low-frequency display effect.

In an embodiment of the disclosure, the drive transistor T3, the data writing transistor T4, the first light emitting control transistor T5, the second light emitting control transistor T6 and the second reset transistor T7 are all P-type transistors, and the first reset transistor T1 and/or the compensation transistor T2 are N-type transistors.

Figure 5:
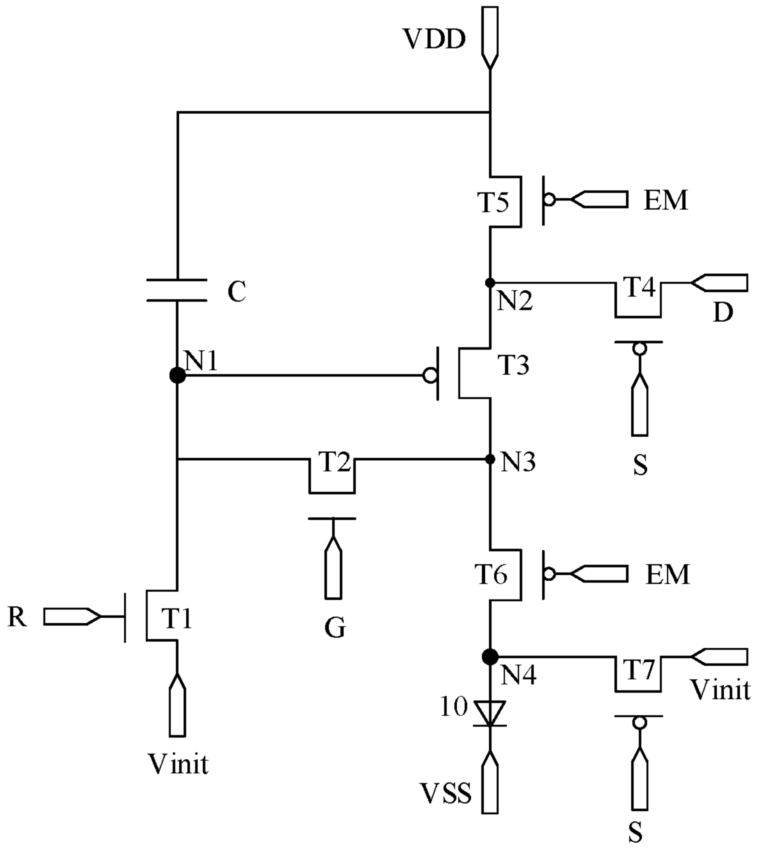
FIG. 5 is a schematic structural diagram of a pixel circuit according to an embodiment of the disclosure.

In one of embodiments, as shown in FIG. 5, the drive transistor T3, the data writing transistor T4, the first light emitting control transistor T5, the second light emitting control transistor T6 and the second reset transistor T7 are all P-type transistors, and the first reset transistor T1 and the compensation transistor T2 are both N-type transistors. Still referring to FIG. 5, active layers of the drive transistor T3, the data writing transistor T4, the first light emitting control transistor T5, the second light emitting control transistor T6 and the second reset transistor T7 are made of a low temperature poly-silicon material, and active layers of the first reset transistor T1 and the compensation transistor T2 are made of a metal oxide semiconductor material.

Still referring to FIG. 5, in the pixel circuit provided by an embodiment of the disclosure, the first reset transistor T1 and the compensation transistor T2 may be N-type transistors with the active layers made of the metal oxide semiconductor material, so that the first reset transistor T1 and the compensation transistor T2 have small leakage currents in the actual work of the pixel circuit. The drive transistor T3, the data writing transistor T4, the first light emitting control transistor T5, the second light emitting control transistor T6 and the second reset transistor T7 may be P-type transistors with the active layers made of the low temperature poly-silicon material, that is, the corresponding transistors are Low Temperature Poly-silicon (LTPS)-type transistors. In this case, the drive transistor T3, the data writing transistor T4, the first light emitting control transistor T5, the second light emitting control transistor T6 and the second reset transistor T7 have higher mobility and lower power consumption in the actual work of the pixel circuit, and may be made thinner, etc. Thus, the pixel circuit shown in FIG. 5 is actually a Low Temperature Poly-silicon+Oxide (LTPO) pixel circuit manufactured by combination of processes of manufacturing two types of transistors (LTPS-type transistor and Oxide transistor), thus ensuring that the leakage current of the gate of the drive transistor T3 is relatively small, and the power consumption is relatively low.

Figure 6:
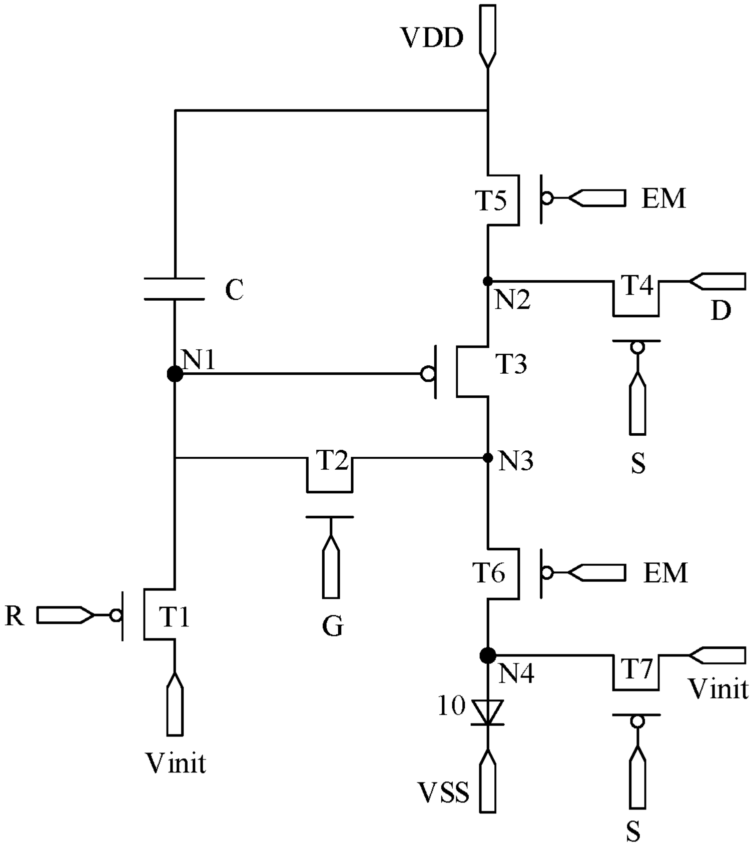
FIG. 6 is a schematic structural diagram of a pixel circuit according to an embodiment of the disclosure.

In an embodiment of the disclosure, as shown in FIG. 6, the first reset transistor T1, the drive transistor T3, the data writing transistor T4, the first light emitting control transistor T5, the second light emitting control transistor T6 and the second reset transistor T7 are all P-type transistors, and the compensation transistor T2 is an N-type transistor.

Still referring to FIG. 6, in the pixel circuit provided by an embodiment of the disclosure, the compensation transistor T2 may be an N-type transistor with the active layer made of the metal oxide semiconductor material, so that the compensation transistor T2 has a small leakage current in the actual work of the pixel circuit. The first reset transistor T1, the drive transistor T3, the data writing transistor T4, the first light emitting control transistor T5, the second light emitting control transistor T6 and the second reset transistor T7 may be P-type transistors with the active layers made of the low temperature poly-silicon material, that is, the corresponding transistors are LTPS-type transistors. In this case, the first reset transistor T1, the drive transistor T3, the data writing transistor T4, the first light emitting control transistor T5, the second light emitting control transistor T6 and the second reset transistor T7 have higher mobility and lower power consumption in the actual work of the pixel circuit, and may be made thinner, etc. Thus, the pixel circuit shown in FIG. 6 is actually an LTPO-type pixel circuit, which takes into account the effects of low leakage current and low power consumption, ensuring the use performance of the pixel circuit.

Figure 7:
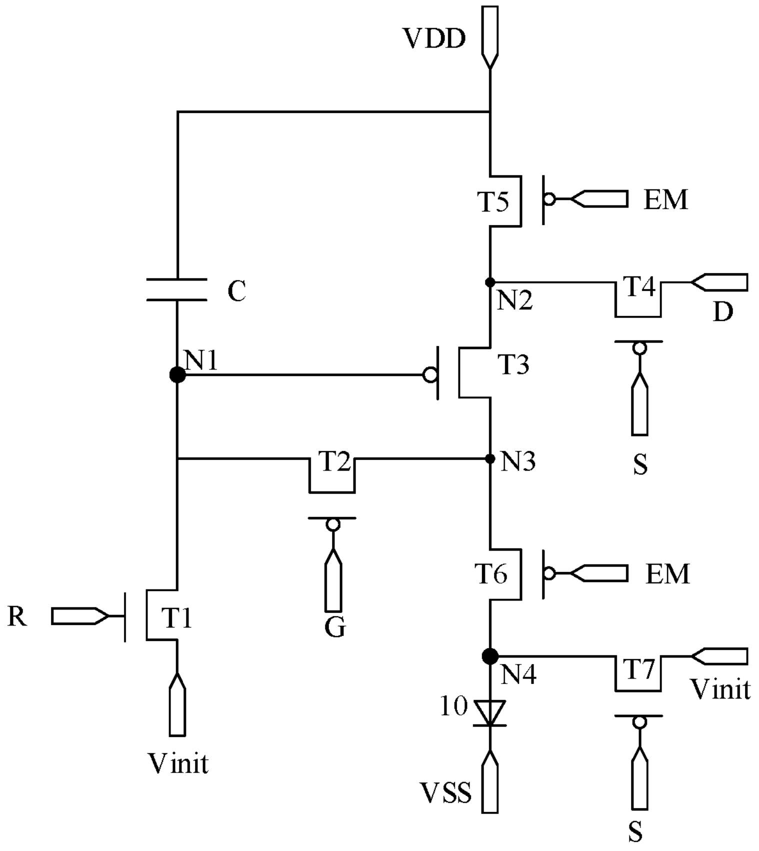
FIG. 7 is a schematic structural diagram of a pixel circuit according to an embodiment of the disclosure.

In an embodiment of the disclosure, as shown in FIG. 7, the compensation transistor T2, the drive transistor T3, the data writing transistor T4, the first light emitting control transistor T5, the second light emitting control transistor T6 and the second reset transistor T7 are all P-type transistors, and the first reset transistor T1 is an N-type transistor.

Still referring to FIG. 7, in the pixel circuit provided by an embodiment of the disclosure, the first reset transistor T1 may be an N-type transistor with the active layer made of the metal oxide semiconductor material, so that the compensation transistor T2 has a small leakage current in the actual work of the pixel circuit. The compensation transistor T2, the drive transistor T3, the data writing transistor T4, the first light emitting control transistor T5, the second light emitting control transistor T6 and the second reset transistor T7 may be P-type transistors with the active layers made of the low temperature poly-silicon material. That is, the corresponding transistors are LTPS-type transistors. In this case, the compensation transistor T2, the drive transistor T3, the data writing transistor T4, the first light emitting control transistor T5, the second light emitting control transistor T6 and the second reset transistor T7 have the higher mobility and lower power consumption in the actual work of the pixel circuit, and may be made thinner, etc. Thus, the pixel circuit shown in FIG. 7 is actually an LTPO-type pixel circuit, which takes into account the effects of low leakage current and low power consumption, ensuring the use performance of the pixel circuit.

It should be noted that the light emitting device 10 in embodiments of the disclosure may be set as an electroluminescent diode, e.g., at least one of Organic Light Emitting Diode (OLED), Quantum Dot Light Emitting Diode (QLED), or micro Light Emitting Diode/Mini Light Emitting Diode, which is not limited here. Here, the light emitting device 10 may include an anode, a light emitting layer and a cathode that are stacked. Further, the light emitting layer may also include a hole injection layer, a hole transport layer, an electron transport layer, an electron injection layer, and other layers. Of course, the light emitting device 10 may be designed according to requirements of the actual application environment in practical applications, and is not limited here.

The functions of the first and second electrodes of each of the above transistors are interchangeable according to corresponding types and different signals of signal terminals. For example, the first electrode may be a source, and correspondingly the second electrode may be a drain; for another example, the first electrode may be a drain, and correspondingly the second electrode may be a source, which is not limited here. Each transistor may be a Thin Film Transistor (TFT) or a Metal Oxide Semiconductor (MOS) field effect transistor, which is not limited here. Of course, the specific type of each transistor may also be set according to the actual application requirements, and is not limited here.

The above is just an example to illustrate the specific structure of the pixel circuit provided by embodiments of the disclosure. In a specific implementation, the specific structure of the above-mentioned pixel circuit is not limited to the above-mentioned structures provided by embodiments of the disclosure, and may also be other structures known to those skilled in the art, which are all within the protection scope of the disclosure and are not limited here.

Figure 8:
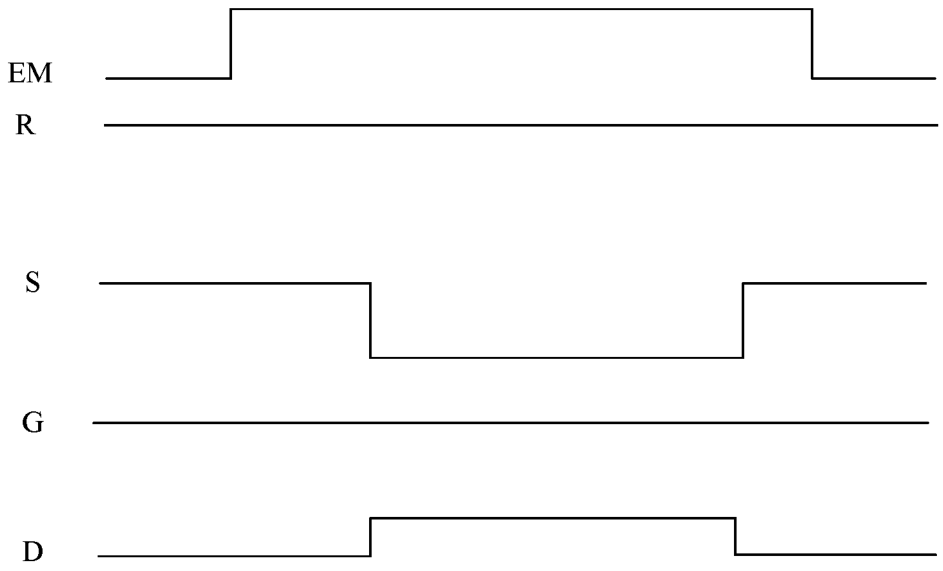
FIG. 8 is a timing diagram of a holding frame corresponding to the pixel circuit shown in FIG. 3.

The working process of the pixel circuit provided by embodiments of the disclosure will be illustrated below using the structure of the pixel circuit shown in FIG. 3 and the timing diagrams shown in FIG. 4 and FIG. 8, where FIG. 4 is a timing diagram of the writing frame corresponding to the pixel circuit shown in FIG. 3, and FIG. 8 is a timing diagram of the holding frame corresponding to the pixel circuit shown in FIG. 3. Here, the potential signal provided by the first power supply terminal VDD is at a high level, and the potential signal provided by the second power supply terminal VSS is at a low level. In a specific implementation process, a current display frame of the display device may be divided into one writing frame and N holding frames according to a current refresh frequency and a reference refresh frequency of the display device, where N is an integer greater than 1. For example, the current refresh frequency is 40 Hz, the reference refresh frequency is 120 Hz and is three times the current refresh frequency, and the current display frame may be divided into one writing frame and two holding frames in sequence. For another example, the current refresh frequency is 60 Hz, the reference refresh frequency is 120 Hz and is twice the current refresh frequency, and the current display frame may be divided into one writing frame and one holding frame in sequence. Of course, the current display frame may also be divided according to actual application requirements, which is not limited here. In the timing diagram as shown in FIG. 4, one writing frame includes an initialization phase t1, a first reset phase t2, a data writing phase t3, a second reset phase t4 and a light emitting phase t5 set in sequence. It should be noted that embodiments of the disclosure are intended to better explain the pixel circuit provided by the disclosure and do not limit the specific implementations of the disclosure, where "0" represents the low level, and "1" represents the high level.

In the initialization phase t1, EM=1, Reset=0, Scan=1, and Gate=1.

Figure 9:
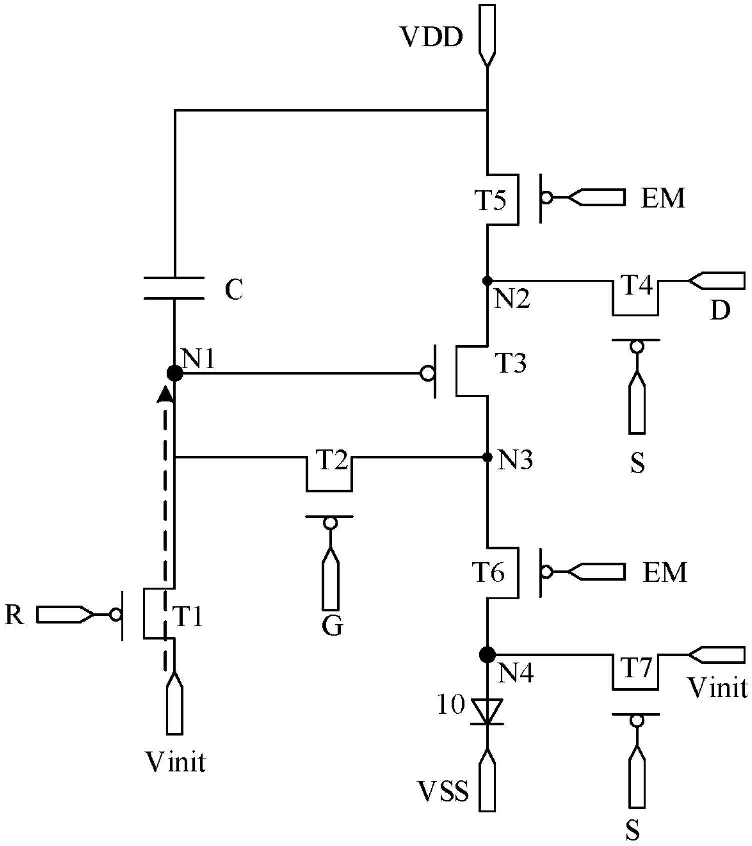
FIG. 9 is a work schematic diagram of the pixel circuit shown in FIG. 3 in a initialization phase.

As shown in FIG. 9, FIG. 9 is a work schematic diagram of the pixel circuit in the initialization phase t1. In the initialization phase t1, the first reset transistor T1 is turned on under the control of the low level of the reset control signal provided by the reset control terminal R; and when the drive transistor T3 is turned on, the initialization signal is written to the gate (i.e., node N1) of the drive transistor T3 through the initialization signal terminal Vinit, and stored in the storage capacitor C. Moreover, the potential of the node N1 is: Vg=Vinit. Moreover, the first light emitting control transistor T5 and the second light emitting control transistor T6 are turned off under the control of the high level of the light emitting control signal provided by the light emitting control terminal EM, and the light emitting device 10 does not emit light. The data writing transistor T4 and the second reset transistor T7 are turned off under the control of the high level of the second scan control signal provided by the second scan control terminal S. The compensation transistor T2 is turned off under the control of the high level of the first scan control signal provided by the first scan control terminal G.

In the first reset phase t2, EM=1, Reset=1, Scan=0, and Gate=1.

Figure 10:
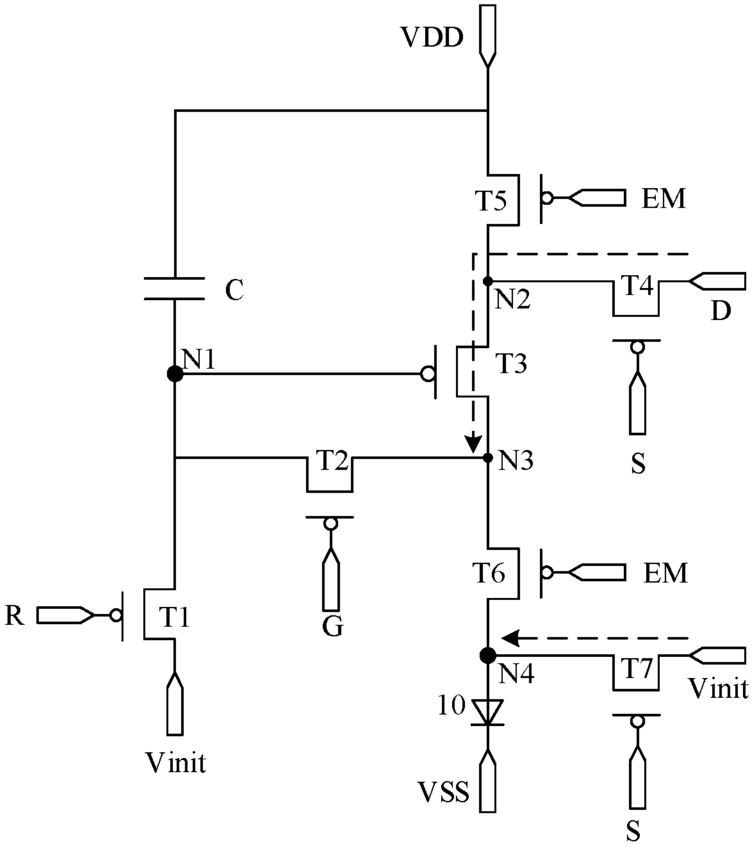
FIG. 10 is a work schematic diagram of the pixel circuit shown in FIG. 3 in a first reset phase.

As shown in FIG. 10, FIG. 10 is a work schematic diagram of the pixel circuit in the first reset phase t2. In the first reset phase t2, the data writing transistor T4 is turned on under the control of the low level of the second scan control signal provided by the second scan control terminal S. At this time, a relatively-large constant reset signal is written into the second electrode (i.e., node N2) of the drive transistor T3 through the data signal terminal D; and when the drive transistor T3 is turned on, the constant reset signal may be written to the first electrode (i.e., node N1) of the drive transistor T3. In one of embodiments, the constant reset signal is 7V and the initialization signal is −3V. In the first reset phase, the potential difference between the gate and the source of the drive transistor T3 is: Vgs=−10V. In this way, the drive transistor T3 has a large Vgs, which can improve the filling state of the channel defect state of the previous picture, and thus alleviate the residual image. Moreover, the second reset transistor T7 is turned on under the control of the low level of the second scan control signal provided by the second scan control terminal S, and the initialization signal provided by the initial signal terminal Vinit may be written into the first electrode (i.e., node N4) of the light emitting device 10. When the first electrode of the light emitting device 10 is an anode, the anode reset is realized, to ensure the low frequency display. Moreover, the first light emitting control transistor T5 and the second light emitting control transistor T6 are turned off under the control of the high level of the light emitting control signal provided by the light emitting control terminal EM, and the light emitting device 10 does not emit light. The first reset transistor T1 is turned off under the control of the high level of the reset control signal provided by the reset control terminal R. The compensation transistor T2 is turned off under the control of the high level of the first scan control signal provided by the first scan control terminal G.

In the data writing phase t3, EM=1, Reset=1, Scan=0, and Gate=0.

Figure 11:
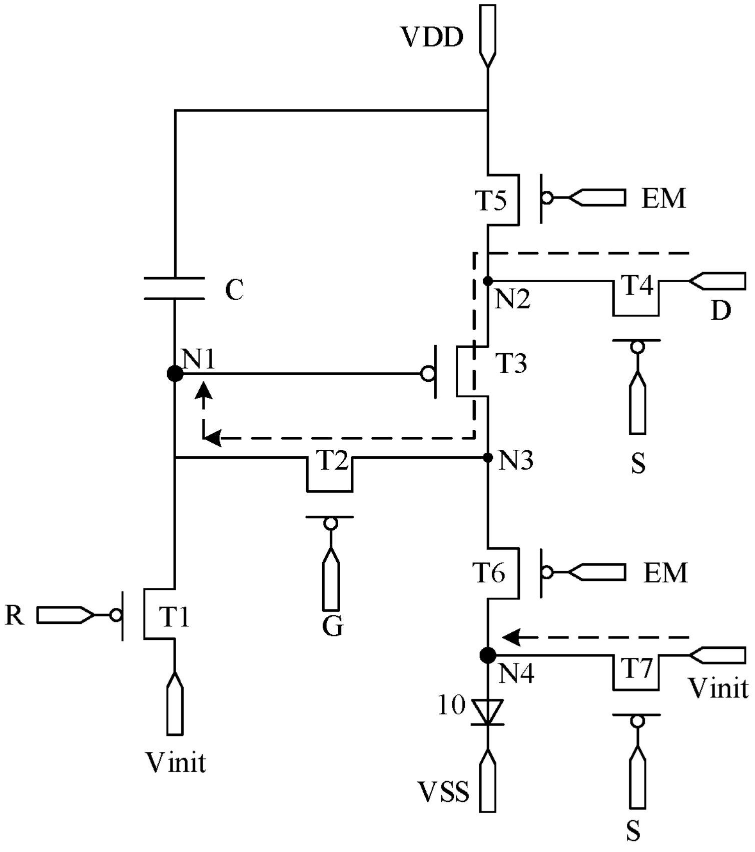
FIG. 11 is a work schematic diagram of the pixel circuit shown in FIG. 3 in a data writing phase.

As shown in FIG. 11, FIG. 11 is a work schematic diagram of the pixel circuit in the data writing phase t3. In the data writing phase t3, the compensation transistor T2 is turned on under the control of the low level of the first scan control signal provided by the first scan control terminal G. The data writing transistor T4 is turned on under the control of the low level of the second scan control signal provided by the second scan control terminal S. At this time, the data signal actually required in the light emitting phase t5 may be written into the second electrode of the drive transistor T3 through the data signal terminal D, and the threshold voltage of the drive transistor T3 and the data signal are written into the gate of the drive transistor T3 through the compensation transistor T2, until the potential of the node N1 is: Vg=Vdata+Vth, where Vth represents the threshold voltage of the drive transistor T3, and Vdata represents the voltage of the data signal. Also, the signal written to the gate of the drive transistor T3 may also be stored in the storage capacitor C. In this way, after the current path of the drive transistor T3 and the light emitting device 10 is formed, the drive transistor T3 generates a driving current under the action of the signal released by the storage capacitor C, to control the light emitting device 10 to emit light, and ensure the driving capability of the pixel circuit. Moreover, the second reset transistor T7 is turned on under the control of the low level of the second scan control signal provided by the second scan control terminal S, and the initialization signal provided by the initial signal terminal Vinit may be written into the first electrode of the light emitting device 10. When the first electrode of the light emitting device 10 is an anode, the anode reset is realized, to ensure the low frequency display. Moreover, the first light emitting control transistor T5 and the second light emitting control transistor T6 are turned off under the control of the high level of the light emitting control signal provided by the light emitting control terminal EM, and the light emitting device 10 does not emit light. The first reset transistor T1 is turned off under the control of the high level of the reset control signal provided by the reset control terminal R.

In the second reset phase t4, EM=1, Reset=1, Scan=0, and Gate=1.

Figure 12:
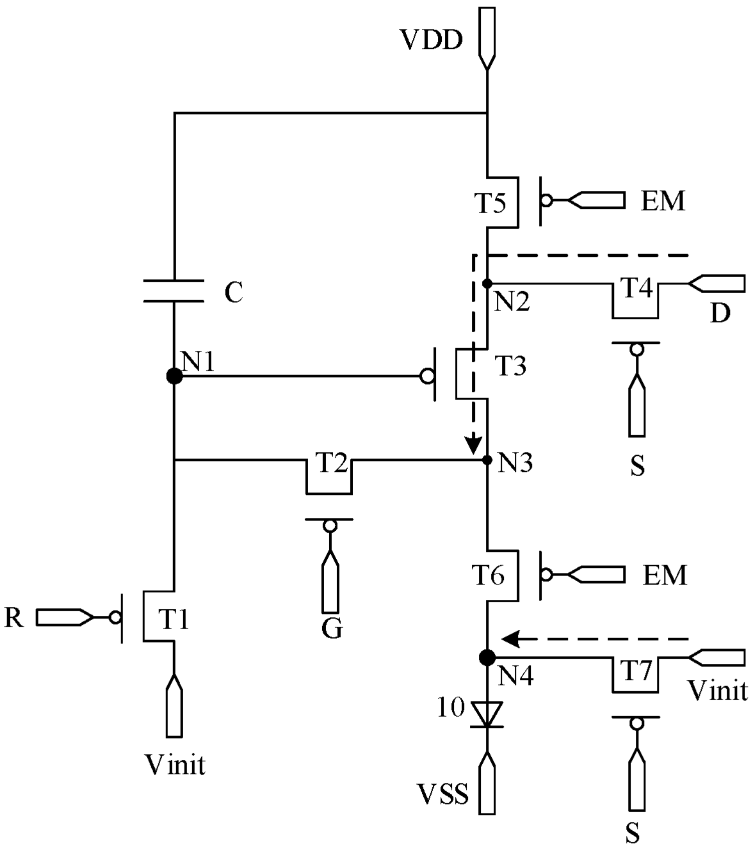
FIG. 12 is a work schematic diagram of the pixel circuit shown in FIG. 3 in a second reset phase.

As shown in FIG. 12, FIG. 12 is a work schematic diagram of the pixel circuit in the second reset phase t4. In the second reset phase t4, the data writing transistor T4 is turned on under the control of the low level of the second scan control signal provided by the second scan control terminal S. At this time, the constant reset signal may be written into the second electrode of the drive transistor T3 through the data signal terminal D; and correspondingly, the voltage of the node N2 is a fixed voltage value. At this time, since the potential of the node N1 is: Vg=Vdata+Vth, the node N3 will also be refreshed to a fixed voltage value. In this way, before the light emitting device 10 emits light, the potential of the node N3 is identical in the writing frame and the holding frame in the same gray-scale frame, thus avoiding the problem of frequency cut flicker. Moreover, the second reset transistor T7 is turned on under the control of the low level of the second scan control signal provided by the second scan control terminal S, and the initialization signal provided by the initial signal terminal Vinit may be written into the first electrode of the light emitting device 10. When the first electrode of the light emitting device 10 is an anode, the anode reset is realized, to ensure the low frequency display. Moreover, the first light emitting control transistor T5 and the second light emitting control transistor T6 are turned off under the control of the high level of the light emitting control signal provided by the light emitting control terminal EM, and the light emitting device 10 does not emit light. The first reset transistor T1 is turned off under the control of the high level of the reset control signal provided by the reset control terminal R. The compensation transistor T2 is turned off under the control of the high level of the first scan control signal provided by the first scan control terminal G. In this way, no matter what kind of picture is written, the potential of the node N3 can be guaranteed to be identical in the writing frame and the holding frame, avoiding the problem of frequency cut flicker effectively.

In the light emitting phase t5, EM=0, Reset=1, Scan=1, and Gate=1.

Figure 13:
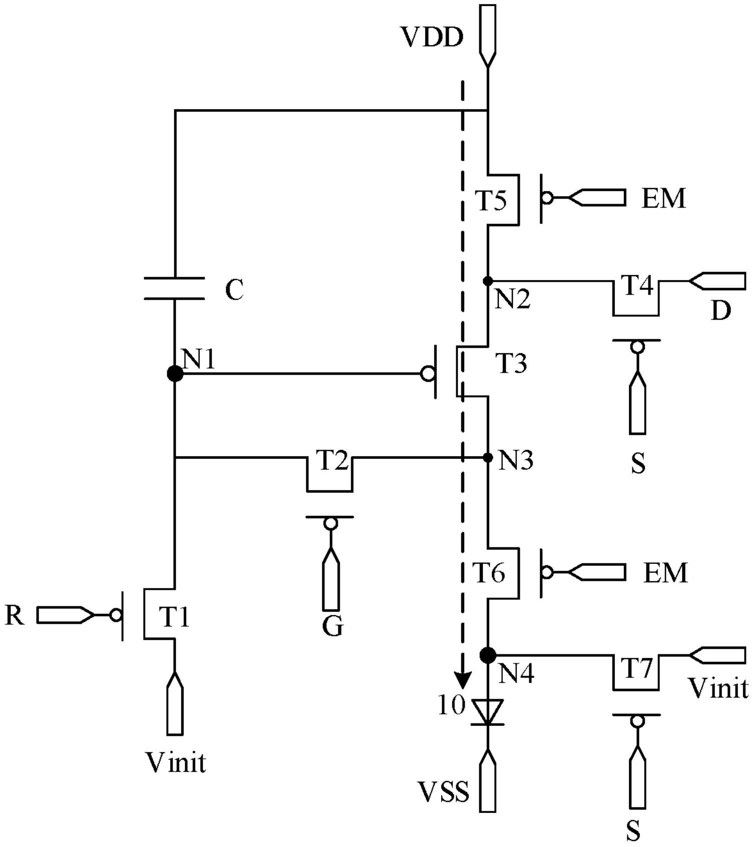
FIG. 13 is a work schematic diagram of the pixel circuit shown in FIG. 3 in a light emitting phase.

As shown in FIG. 13, FIG. 13 is a work schematic diagram of the pixel circuit in the light emitting phase t5. In the light emitting phase t5, the first light emitting control transistor T5 and the second light emitting control transistor T6 are turned on under the control of the low level of the light emitting control signal provided by the light emitting control terminal EM, and the light emitting device 10 emits light. Also, the first reset transistor T1 is turned off under the control of the high level of the reset control signal provided by the reset control terminal R. The compensation transistor T2 is turned off under the control of the high level of the first scan control signal provided by the first scan control terminal G. The data writing transistor T4 and the second reset transistor T7 are turned off under the control of the high level of the second scan control signal provided by the second scan control terminal S.

It should be noted that the directions shown by the arrows in FIGS. 9 to 13 are the directions of the currents in the corresponding phases.

In an embodiment of the disclosure, for the holding frame, the reset control signal received by the reset control terminal and the first scan signal received by the first scan control terminal may be held as invalid potentials. Under the control of the second scan control terminal, the constant reset signal is written to the first electrode of the drive transistor through the data signal terminal. Taking the pixel circuit shown in FIG. 3 as an example and still referring to FIG. 8, for the holding frame, the reset control signal provided by the reset control terminal R and the first scan control signal provided by the first scan control terminal G remain at the high level. Accordingly, the node N1 is not reset or the data is not written. In this way, under the control of the second scan signal provided by the second scan control terminal S, the constant reset signal is written to the first electrode of the drive transistor T3 through the data signal terminal D, to ensure that the potential of the node N3 is identical in the writing frame and the holding frame in the same gray-scale frame, thus avoiding the problem of frequency cut flicker.

Figure 14:
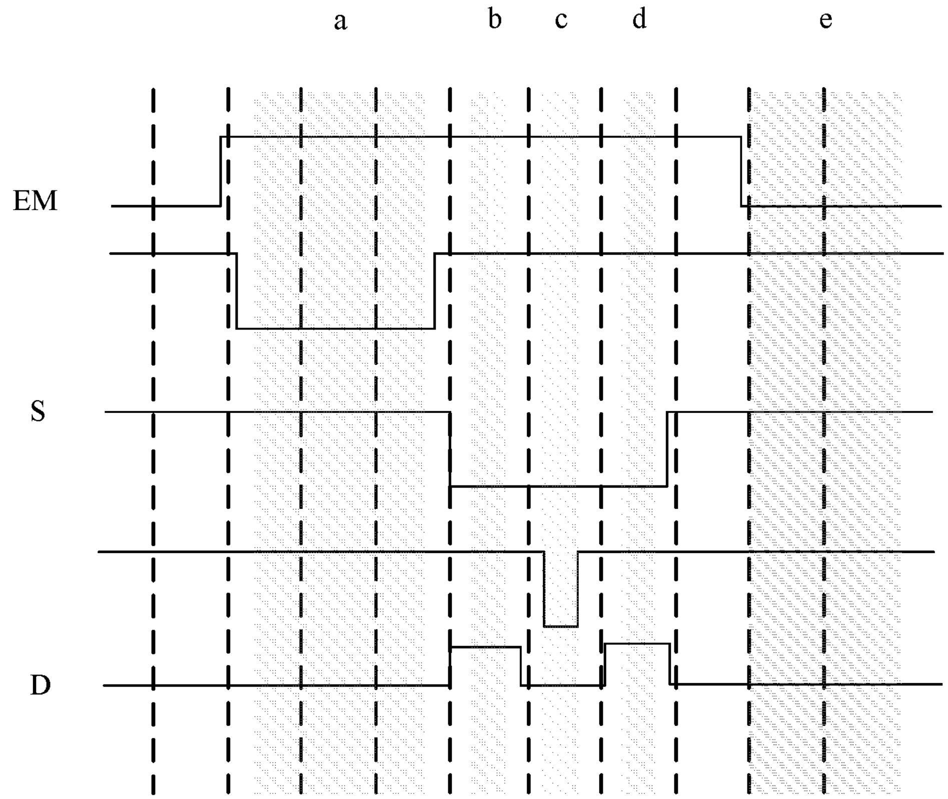
FIG. 14 is a timing diagram of the writing frame corresponding to the pixel circuit shown in FIG. 3.

In one of embodiments, for the pixel circuit shown in FIG. 3, the timing diagram shown in FIG. 14 may be used for the writing frame when the reset control terminal R and the second scan control terminal S are coupled to different output terminals of the same second gate drive unit respectively. Still as shown in FIG. 14, the writing frame includes phases a, b, c, d and e, where the node N1 is reset in the phase a. In the phase b, the node N1 is reset to the low level, and the nodes N2 and N3 may be reset to the high level through a higher constant reset signal loaded by the data signal terminal D, so that the drive transistor T3 has a higher gate-source voltage, thus alleviating the hysteresis phenomenon of the drive transistor T3. In the phase c, the data signal actually required in the light emitting phase may be written to the gate of the drive transistor T3 through the data signal terminal D. In the phase d, the node N3 is reset again to ensure that the potential of the node N3 is identical in the writing frame and the holding frame, thus alleviating the low-gray flicker. In the phase e, the light emitting device emits light. Moreover, the specific working process of the pixel circuit in the phases a to e is roughly the same as that in FIG. 4 and will not be detailed here. Also, in an embodiment, the timing diagram shown in FIG. 8 may still be used for the holding frame, and the specific working process of the pixel circuit is roughly the same as that shown in FIG. 8 and will not be detailed here.

It should be noted that, in one of embodiments, the writing frame of the pixel circuit provided by an embodiment of the disclosure may also include an initialization phase t1, a first reset phase t2, a data writing phase t3 and a light emitting phase t5 in sequence. At this time, the working process of the pixel circuit in each phase can refer to the description of the relevant part above, and will not be detailed here.

In one of embodiments, the writing frame of the pixel circuit provided by an embodiment of the disclosure may also include an initialization phase t1, a data writing phase t3, a second reset phase t4 and a light emitting phase t5 in sequence. At this time, the working process of the pixel circuit in each phase can refer to the description of the relevant part above, and will not be detailed here.

Figure 15:
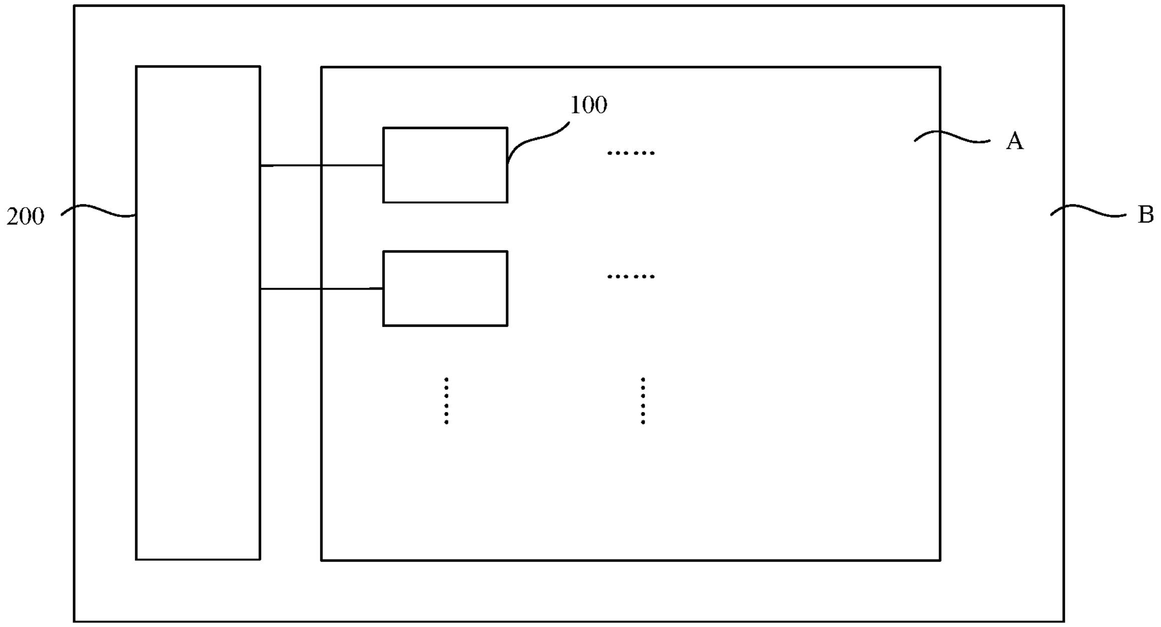
FIG. 15 is a schematic structural diagram of a display device according to an embodiment of the disclosure.

Based on the same disclosure concept, as shown in FIG. 15, an embodiment of the disclosure further provides a display device. The display device includes: a plurality of pixel circuits 100 as described above arranged in a display area A, and a gate drive circuit 200 arranged in a non-display area B. The gate drive circuit 200 is configured to provide corresponding signals to reset control terminals R, first scan control terminals G and second scan control terminals S of the pixel circuits 100.

In a specific implementation process, a distribution schematic diagram of the display area A and the non-display area B may be as shown in FIG. 15. The display area A and the non-display area B may also be divided according to actual application requirements, which will not be described in detail here.

Figure 16:
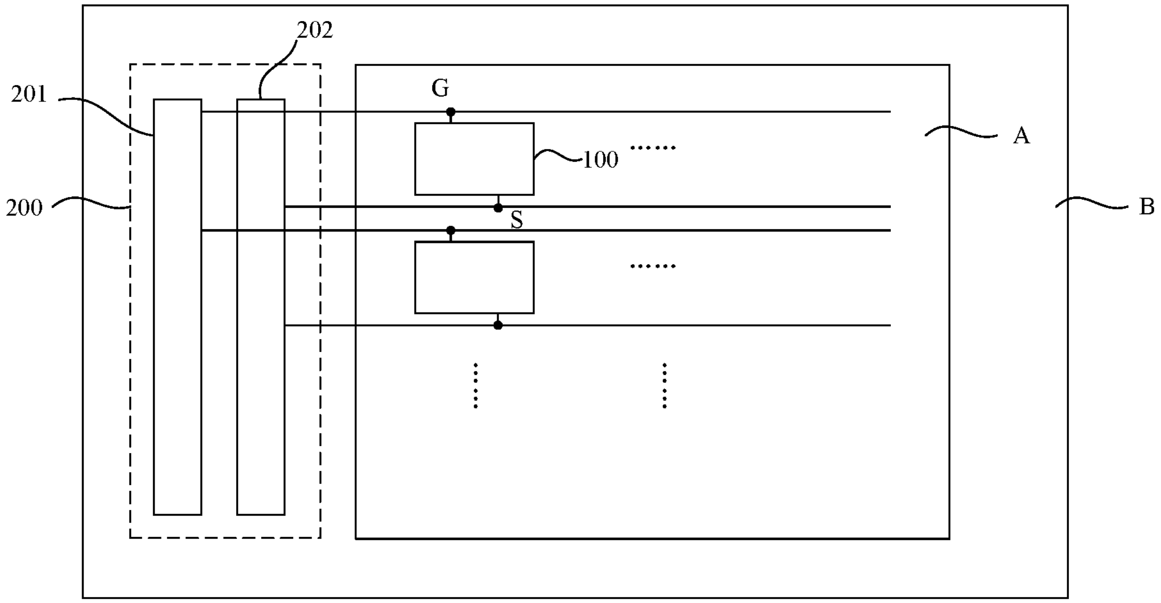
FIG. 16 is a schematic structural diagram of a display device according to an embodiment of the disclosure.

In one of embodiments, as shown in FIG. 16, the gate drive circuit 200 includes a first gate drive unit 201 and a second gate drive unit 202, the first gate drive unit 201 is coupled to a first scan control terminal G of each pixel circuit 100, and the second gate drive unit 202 is coupled to a second scan control terminal S of each pixel circuit 100.

Still referring to FIG. 16, the first gate drive unit 201 is configured to provide a first scan control signal at a first frequency to the first scan control terminal G; and the second gate drive unit 202 is configured to provide a second scan control signal at a second frequency to the second scan control terminal S. The second frequency is greater than the first frequency, and an effective duration of the second scan control signal is greater than an effective duration of the first scan control signal. In this way, the second scan control signal with the relatively large effective duration and frequency can ensure that the signal provided by the data signal terminal D is fully written into the second electrode of the drive transistor T3, and thus ensure the driving capability of the pixel circuit.

Figure 17:
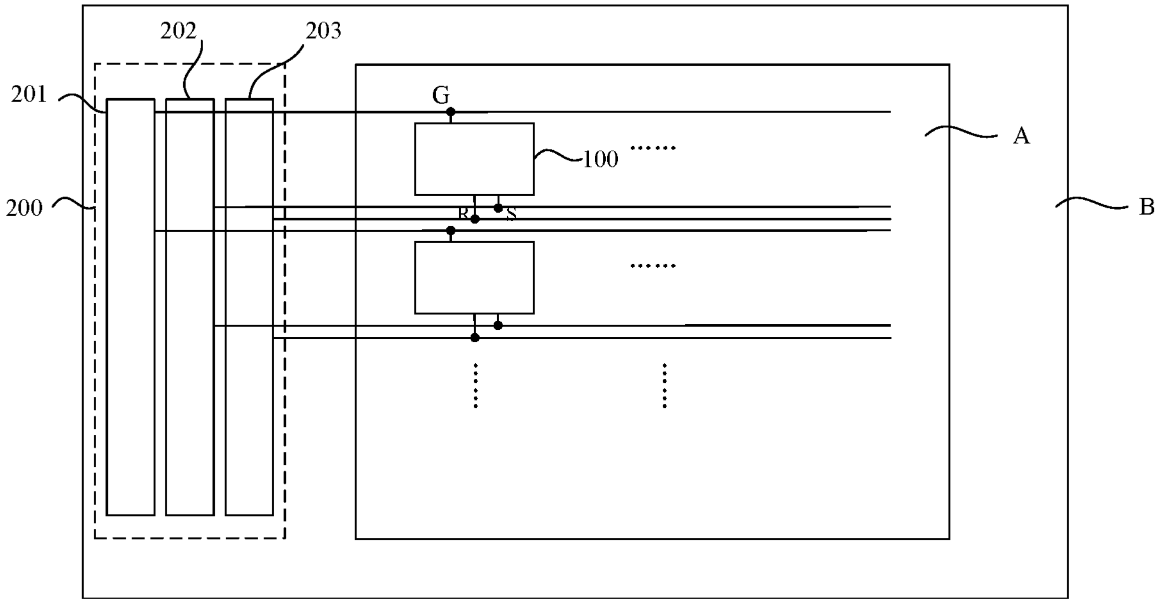
FIG. 17 is a schematic structural diagram of a display device according to an embodiment of the disclosure.

In one of embodiments, as shown in FIG. 17, the gate drive circuit 200 further includes a reset drive unit 203 coupled to a reset control terminal R of each pixel circuit 100.

Figure 18:
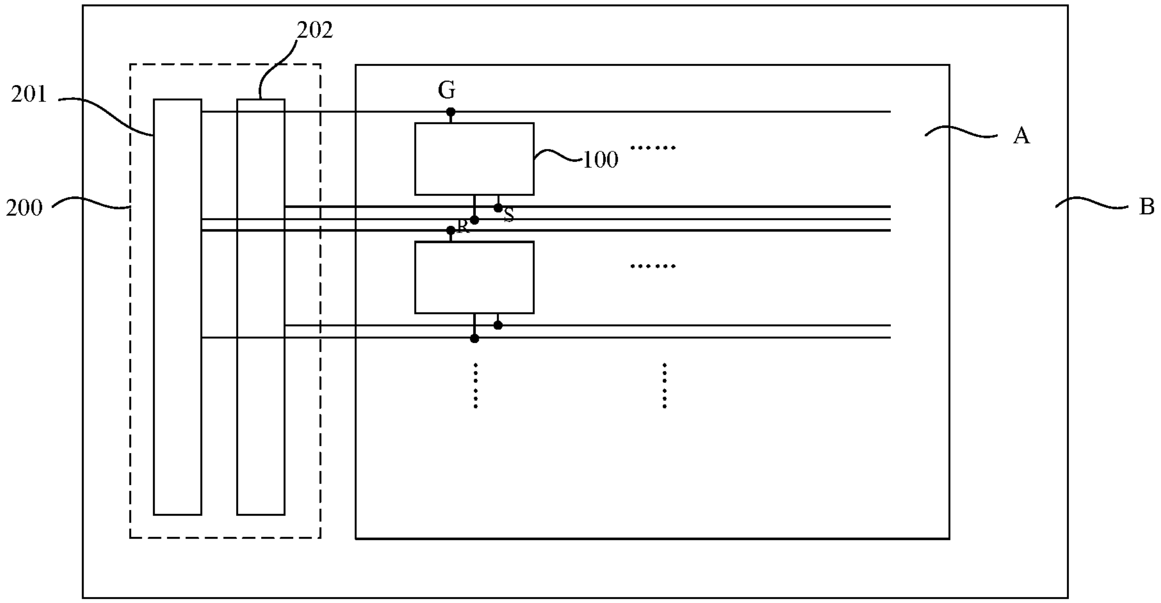
FIG. 18 is a schematic structural diagram of a display device according to an embodiment of the disclosure.

In one of embodiments, as shown in FIG. 18, the first gate drive unit 201 is coupled to the reset control terminal R of each pixel circuit 100, and the reset control terminal R and the first scan control terminal G of a same pixel circuit 100 are respectively coupled to output terminals in different stages of the first gate drive unit 201.

Figure 19:
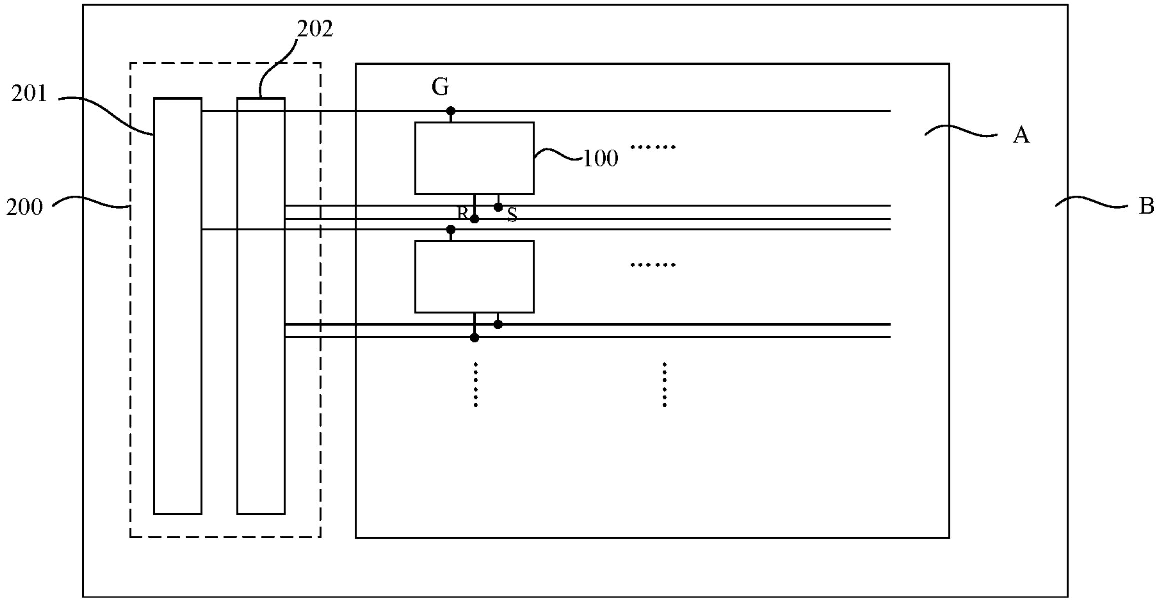
FIG. 19 is a schematic structural diagram of a display device according to an embodiment of the disclosure.

In one of embodiments, as shown in FIG. 19, the second gate drive unit 202 is coupled to the reset control terminal R of each pixel circuit 100, and the reset control terminal R and the second scan control terminal S of the same pixel circuit 100 are respectively coupled to output terminals in different stages of the second gate drive unit 202.

Since the principle of the display device to solve the problem is similar to that of the above-mentioned pixel circuit 100, implementations of the display device can refer to the implementations of the above-mentioned pixel circuit 100, and the repeated description thereof will be omitted here.

In a specific implementation process, the display device provided by an embodiment of the disclosure may be a small-sized AMOLED. In this case, the data writing time of each row may be relatively long, and the first electrode of the drive transistor may be reset through a relatively-large constant reset signal provided by the data signal terminal D. Correspondingly, the display device may be any product or component with display function, such as a watch, a wristband, a mobile phone, etc. All of other indispensable components of the display device should be understood by those ordinary skilled in the art to be included, and will be omitted here and should not be considered as limitations on the disclosure.

Based on the same disclosure concept, an embodiment of the disclosure further provides a driving method for the pixel circuit described above, including following steps.

S101: dividing a current display frame of a display device into one writing frame and N holding frames according to a current refresh frequency and a reference refresh frequency of the display device, where N is an integer greater than 1, and the writing frame includes a first reset phase and/or a second reset phase.

S102: in the first reset phase, controlling the data writing transistor and the drive transistor to be turned on, and writing the constant reset signal into the second electrode and the first electrode of the drive transistor through the data signal terminal.

S103: in the second reset phase, controlling the data writing transistor to be turned on, and writing the constant reset signal into the second electrode of the drive transistor through the data signal terminal.

Figure 20:
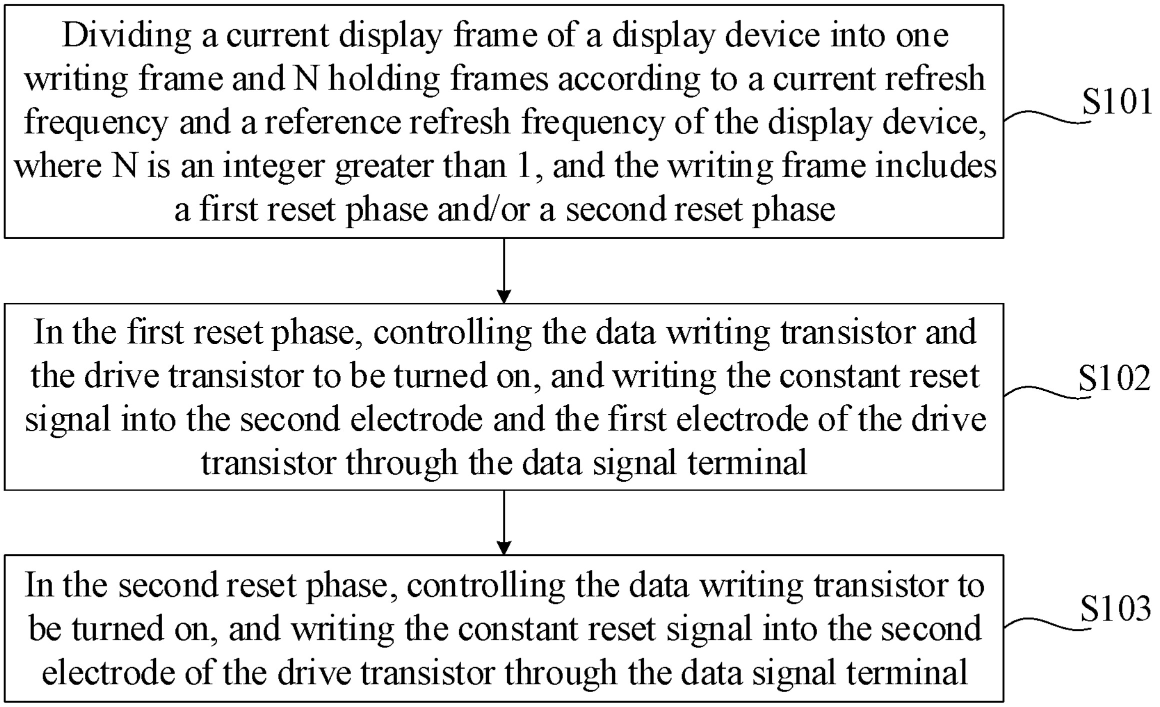
FIG. 20 is a method flowchart of a driving method for a pixel circuit according to an embodiment of the disclosure.

In one of embodiments, the step S101 to step S103 may be executed sequentially as shown in FIG. 20. In one of embodiments, only the step S102 may be executed after the step S101 is performed. In one of embodiments, only the step S103 may be executed after the step S101 is performed. Of course, the execution steps of the writing frame may be set according to actual application requirements. For the specific implementation process of the corresponding execution steps of the writing frame, reference may be made to the foregoing description of the corresponding part using the pixel circuit shown in FIG. 3 and the timing diagram shown in FIG. 4, which will not be repeated here.

Figure 21:
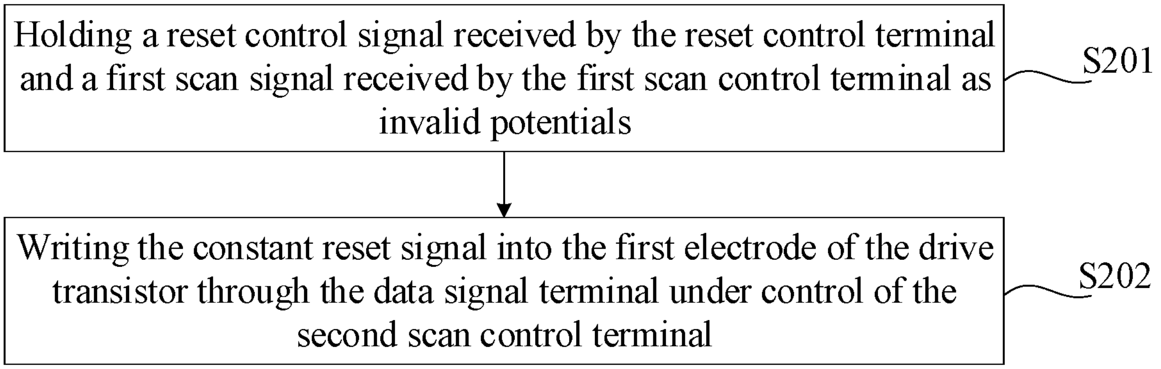
FIG. 21 is a method flowchart of a driving method for a pixel circuit for a holding frame according to an embodiment of the disclosure.

In an embodiment of the disclosure, as shown in FIG. 21, for the holding frames, the method further includes following steps.

S201: holding a reset control signal received by the reset control terminal and a first scan signal received by the first scan control terminal as invalid potentials.

S202: writing the constant reset signal into the first electrode of the drive transistor through the data signal terminal under control of the second scan control terminal.

In one of embodiments, for the specific implementation process of the steps S201 to S202, reference may be made to the foregoing description of the corresponding part using the pixel circuit shown in FIG. 3 and the timing diagram shown in FIG. 4, which will not be repeated here.

In an embodiment of the disclosure, the writing frame includes an initialization phase, the first reset phase, a data writing phase, the second reset phase and a light emitting phase arranged in sequence, and the method further includes following steps.

S301: in the initialization phase, controlling the first reset transistor and the drive transistor to be turned on, and writing an initialization signal into the gate of the drive transistor through the initialization signal terminal.

S302: in the data writing phase, controlling the compensation transistor and the data writing transistor to be turned on, writing the data signal into the second electrode of the drive transistor through the data signal terminal, writing a threshold voltage of the drive transistor and the data signal into the gate of the drive transistor through the compensation transistor, and storing the threshold voltage and the data signal in the storage capacitor.

S303: in the light emitting phase, controlling the first light emitting control transistor and the second light emitting control transistor to be turned on, where the light emitting device emits light.

Figure 22:
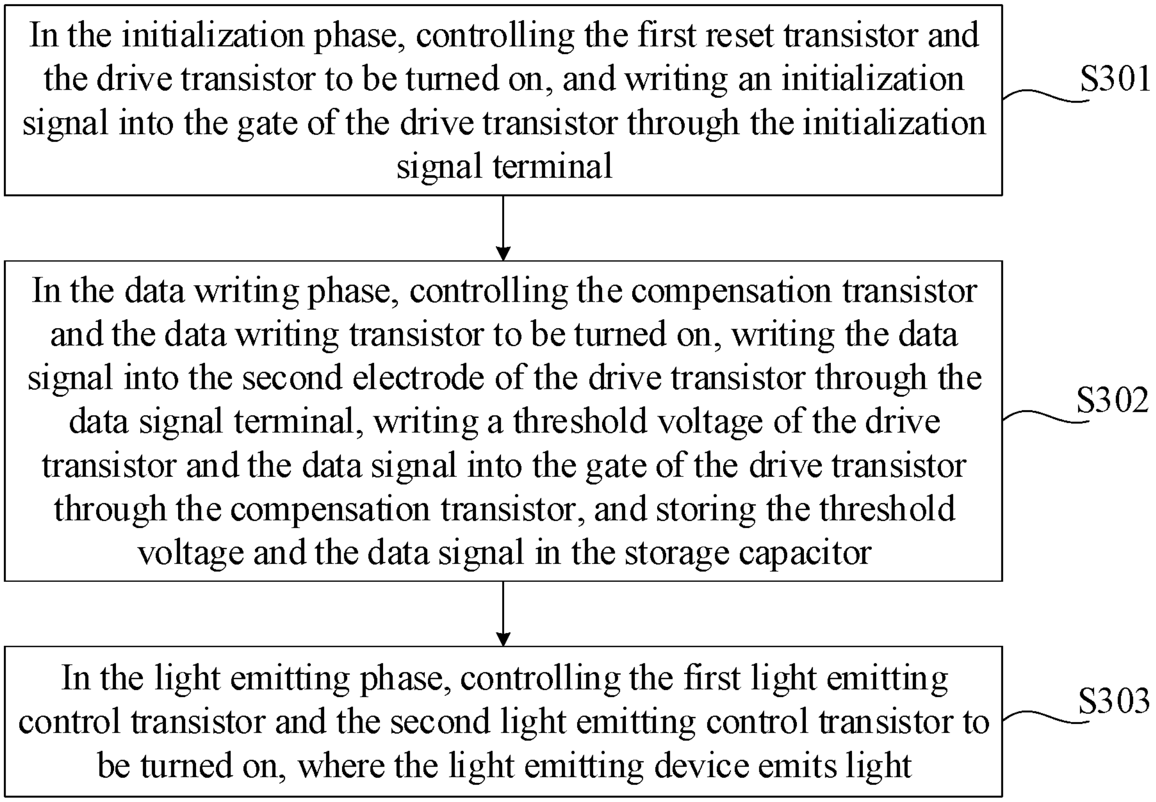
FIG. 22 is a method flowchart of a driving method for a pixel circuit for a writing frame according to an embodiment of the disclosure.

In one of embodiments, as shown in FIG. 22, for the specific implementation process of the steps S301, S102, S302, S103 and S303, reference may be made to the foregoing description of the corresponding part using the pixel circuit shown in FIG. 3 and the timing diagram shown in FIG. 4, which will not be repeated here.

Although embodiments of the disclosure have been described, those skilled in the art can make additional alterations and modifications to these embodiments once they learn about the basic creative concepts. Thus, the attached claims are intended to be interpreted to include embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A pixel circuit, comprising:

a first reset transistor, a compensation transistor, a drive transistor, a data writing transistor, a first light emitting control transistor, a second light emitting control transistor, a second reset transistor, a storage capacitor and a light emitting device; wherein:

the first reset transistor is coupled between a gate of the drive transistor and an initialization signal terminal, and a gate of the first reset transistor is coupled to a reset control terminal;

the compensation transistor is coupled between the gate and a first electrode of the drive transistor, and a gate of the compensation transistor is coupled to a first scan control terminal;

the data writing transistor is coupled between a second electrode of the drive transistor and a data signal terminal, and a gate of the data writing transistor is coupled to a second scan control terminal;

the first light emitting control transistor is coupled between the second electrode of the drive transistor and a first power supply terminal, and a gate of the first light emitting control transistor is coupled to a light emitting control terminal;

the second light emitting control transistor is coupled between the first electrode of the drive transistor and a first electrode of the light emitting device, and a gate of the second light emitting control transistor is coupled to the light emitting control terminal;

the second reset transistor is coupled between the first electrode of the light emitting device and the initialization signal terminal, and a gate of the second reset transistor is coupled to the second scan control terminal;

a second electrode of the light emitting device is coupled to a second power supply terminal;

the storage capacitor is coupled between the first power supply terminal and the gate of the drive transistor;

wherein the first scan control terminal is configured to receive a first scan control signal, the second scan control terminal is configured to receive a second scan control signal, an effective duration of the second scan control signal is greater than an effective duration of the first scan control signal, the effective duration of the first scan control signal is covered by the effective duration of the second scan control signal, the data signal terminal is configured to receive a constant reset signal within other effective duration of the second scan control signal except a covered part, and the data signal terminal is configured to receive a data signal within a duration of the covered part.

2. The pixel circuit according to claim 1, wherein the reset control terminal, the first scan control terminal and the second scan control terminal are respectively coupled to different gate drive units.

3. The pixel circuit according to claim 1, wherein the reset control terminal is configured to receive a reset control signal, the reset control signal and the first scan control signal are provided by output terminals in different stages of a same first gate drive unit, and the reset control signal is earlier than the first scan control signal.

4. The pixel circuit according to claim 1, wherein the reset control terminal is configured to receive a reset control signal, the reset control signal and the second scan control signal are provided by output terminals in different stages of a same second gate drive unit, and the reset control signal is earlier than the second scan control signal.

5. The pixel circuit according to claim 1, wherein the first reset transistor, the compensation transistor, the drive transistor, the data write transistor, the first light emitting control transistor, the second light emitting control transistor and the second reset transistor are all P-type transistors.

6. The pixel circuit according to claim 1, wherein the drive transistor, the data writing transistor, the first light emitting control transistor, the second light emitting control transistor and the second reset transistor are all P-type transistors, and the first reset transistor and/or the compensation transistor are N-type transistors.

7. The pixel circuit according to claim 6, wherein active layers of the drive transistor, the data writing transistor, the first light emitting control transistor, the second light emitting control transistor and the second reset transistor are made of a low temperature poly-silicon material, and active layers of the first reset transistor and the compensation transistor are made of a metal oxide semiconductor material.

8. A display device, comprising: a plurality of pixel circuits according to claim 1 arranged in a display area, and a gate drive circuit arranged in a non-display area, wherein the gate drive circuit is configured to provide corresponding signals to reset control terminals, first scan control terminals and second scan control terminals of the pixel circuits.

9. The display device according to claim 8, wherein the gate drive circuit comprises a first gate drive unit and a second gate drive unit, the first gate drive unit is coupled to a first scan control terminal of each pixel circuit, and the second gate drive unit is coupled to a second scan control terminal of each pixel circuit.

10. The display device according to claim 9, wherein the first gate drive unit is configured to provide a first scan control signal at a first frequency to the first scan control terminal; and the second gate drive unit is configured to provide a second scan control signal at a second frequency to the second scan control terminal; wherein the second frequency is greater than the first frequency, and an effective duration of the second scan control signal is greater than an effective duration of the first scan control signal.

11. The display device according to claim 9, wherein the gate drive circuit further comprises a reset drive unit coupled to a reset control terminal of each pixel circuit.

12. The display device according to claim 9, wherein the first gate drive unit is coupled to a reset control terminal of each pixel circuit, and the reset control terminal and the first scan control terminal of a same pixel circuit are respectively coupled to output terminals in different stages of the first gate drive unit.

13. The display device according to claim 9, wherein the second gate drive unit is coupled to a reset control terminal of each pixel circuit, and the reset control terminal and the second scan control terminal of a same pixel circuit are respectively coupled to output terminals in different stages of the second gate drive unit.

14. A driving method for the pixel circuit according to claim 1, comprising:

dividing a current display frame of a display device into one writing frame and N holding frames according to a current refresh frequency and a reference refresh frequency of the display device, wherein N is an integer greater than 1, and the writing frame comprises a first reset phase and/or a second reset phase;

in the first reset phase, controlling the data writing transistor and the drive transistor to be turned on, and writing the constant reset signal into the second electrode and the first electrode of the drive transistor through the data signal terminal;

in the second reset phase, controlling the data writing transistor to be turned on, and writing the constant reset signal into the second electrode of the drive transistor through the data signal terminal.

15. The driving method according to claim 14, wherein, for the holding frames, the method further comprises:

holding a reset control signal received by the reset control terminal and a first scan signal received by the first scan control terminal as invalid potentials;

writing the constant reset signal into the first electrode of the drive transistor through the data signal terminal under control of the second scan control terminal.

16. The driving method according to claim 15, wherein the writing frame comprises an initialization phase, the first reset phase, a data writing phase, the second reset phase and a light emitting phase arranged in sequence, and the method further comprises:

in the initialization phase, controlling the first reset transistor and the drive transistor to be turned on, and writing an initialization signal into the gate of the drive transistor through the initialization signal terminal;

in the data writing phase, controlling the compensation transistor and the data writing transistor to be turned on, writing the data signal into the second electrode of the drive transistor through the data signal terminal, writing a threshold voltage of the drive transistor and the data signal into the gate of the drive transistor through the compensation transistor, and storing the threshold voltage and the data signal in the storage capacitor;

in the light emitting phase, controlling the first light emitting control transistor and the second light emitting control transistor to be turned on, wherein the light emitting device emits light.

17. The pixel circuit according to claim 1, wherein the light emitting device is an electroluminescent diode.

18. The pixel circuit according to claim 1, wherein the light emitting device comprises: an anode, a light emitting layer and a cathode that are stacked.

19. The pixel circuit according to claim 18, wherein the light emitting layer comprises: a hole injection layer, a hole transport layer, an electron transport layer, and an electron injection layer.

20. The pixel circuit according to claim 1, wherein a potential signal provided by the first power supply terminal is at a high level, and a potential signal provided by the second power supply terminal is at a low level.

* * * * *